Figure 1:
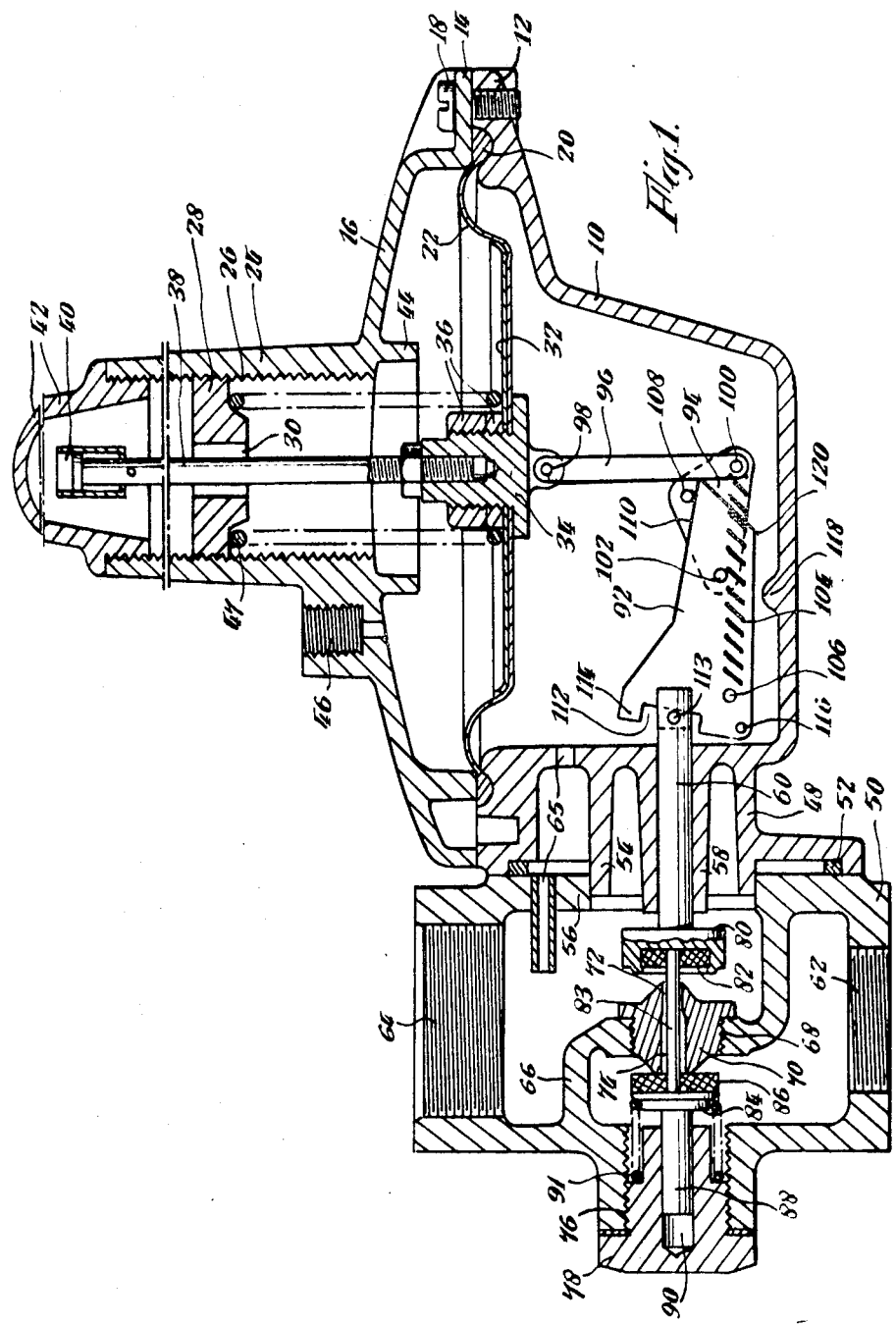

United States Patent

[11] 3,580,271

| [72] | Inventor | Sydney Farrer<br>Sheffield, England |
|---|---|---|
| [21] | Appl. No. | 783,652 |
| [22] | Filed | Dec. 13, 1968 |
| [45] | Patented | May 25, 1971 |
| [73] | Assignee | The Bryan Donkin Company Limited<br>Chesterfield, England |

[54] GAS PRESSURE REGULATORS
3 Claims, 4 Drawing Figs.

[52] U.S. Cl. .................................................. 137/458,
137/463, 137/461, 137/556, 251/80
[51] Int. Cl. ................................................ F16k 17/64
[50] Field of Search .................................... 137/458,
463, 461, 556; 251/79*, 78, 80

[56] References Cited
UNITED STATES PATENTS

| 2,239,254 | 4/1941 | Schoenfeld | 137/463 |
| 2,581,071 | 1/1952 | Born | 137/458 |
| 2,698,026 | 12/1954 | Roberts | 137/458 |
| 3,386,465 | 6/1968 | Johnson | 137/463 |

FOREIGN PATENTS

| 54,526 | 10/1949 | France | 137/456 |

Primary Examiner—Harold W. Weakley
Attorney—Jacobs & Jacobs

ABSTRACT: A diaphragm operated gas regulator has an operating spindle carrying a regulator valve member and a cutoff valve member respectively able to close a pair of orifices arranged back-to-back so that the cutoff valve member provides low-pressure cutoff, the connection between the operating spindle and the diaphragm including a spring loaded overcenter trip linkage so that when gas pressure becomes excessively high the linkage trips to "break" the connection and to close the cutoff valve so as also to provide high-pressure cutoff.

Patented May 25, 1971

3,580,271

3 Sheets-Sheet 1

INVENTOR
SYDNEY FARRER
By Jacobs + Jacobs

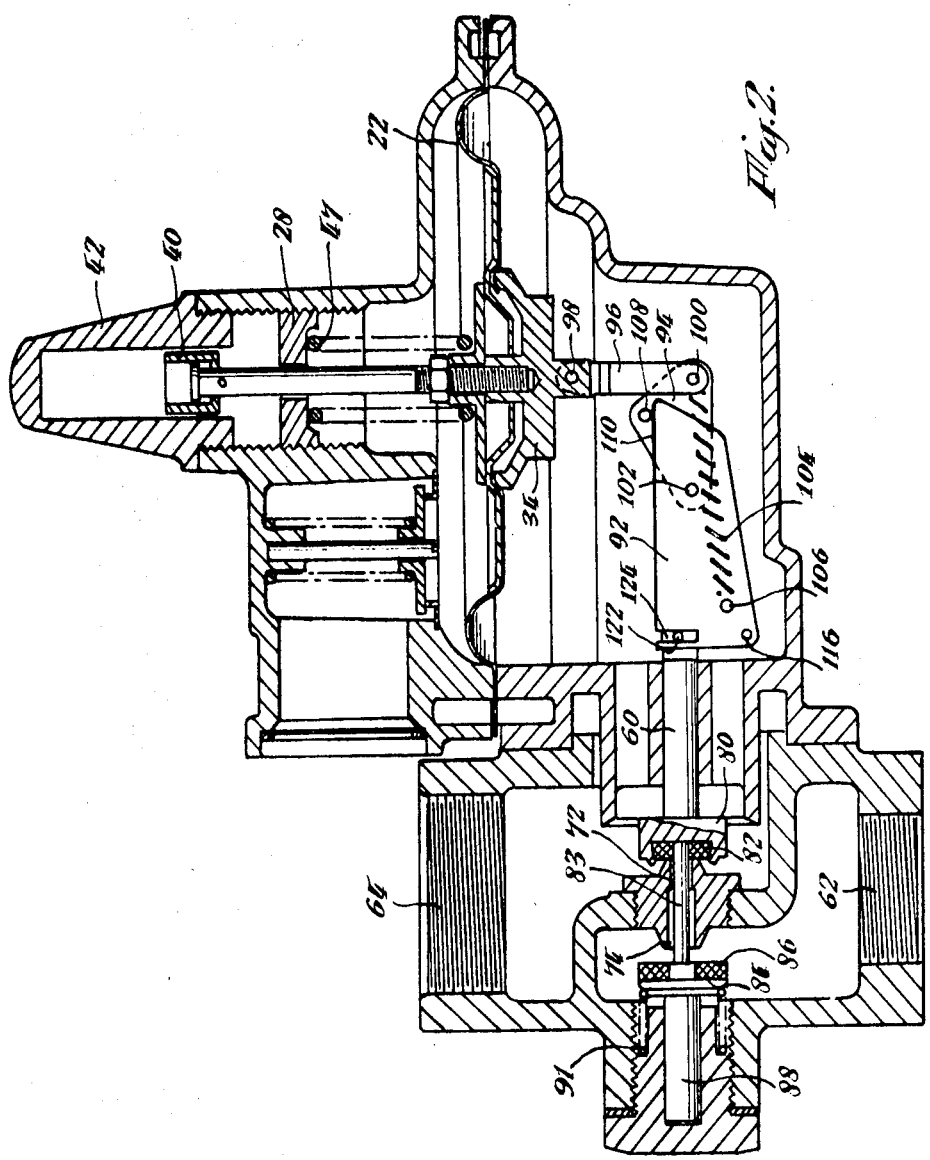

Patented May 25, 1971
3,580,271
3 Sheets-Sheet 3
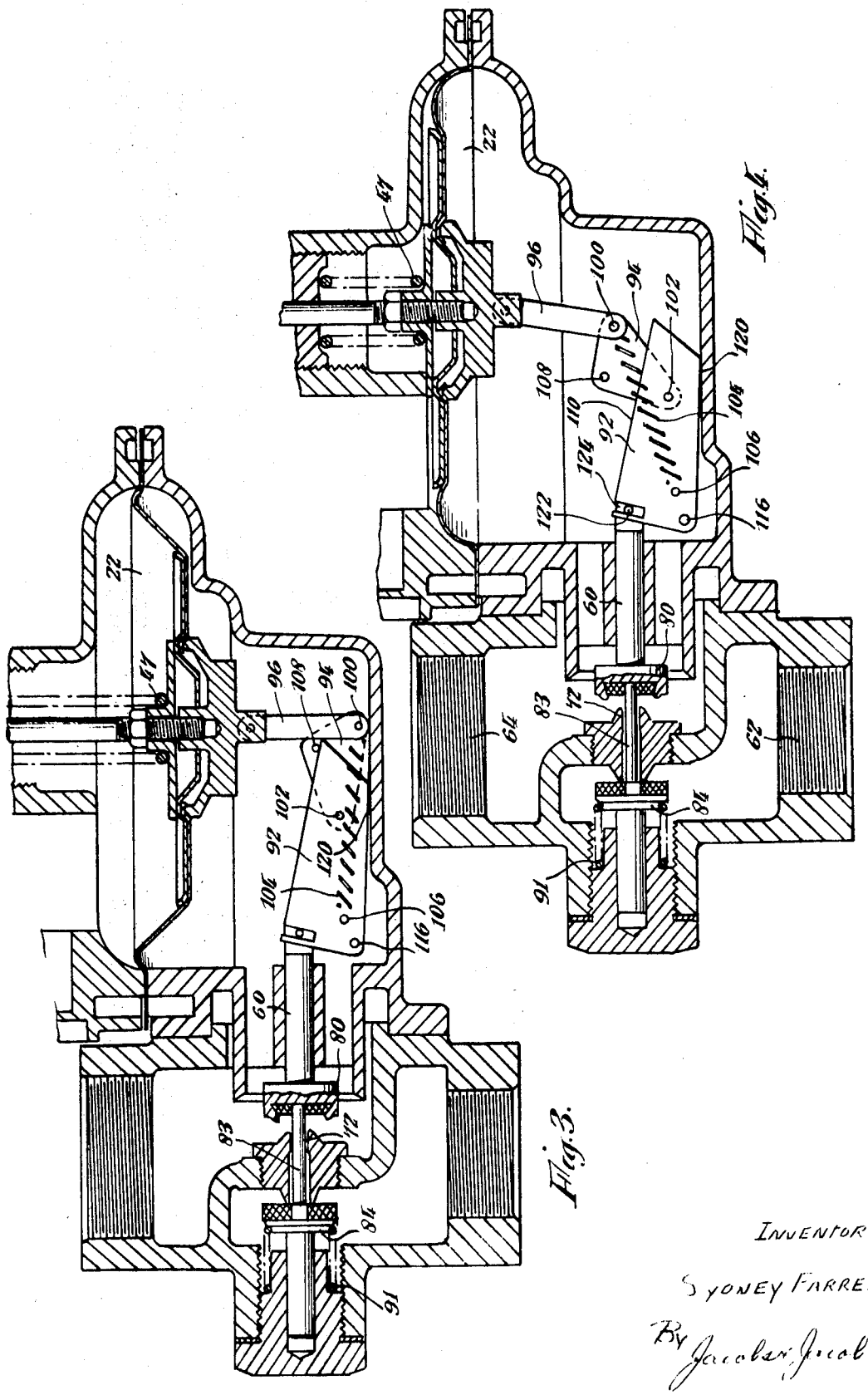
INVENTOR
SYDNEY FARRER
By Jacobs & Jacobs

GAS PRESSURE REGULATORS

This invention relates to gas pressure regulators such as are used for example though not exclusively in gas supply installations.

More particularly the invention relates to pressure regulators which include a gas inlet, a gas outlet, a regulator valve disposed between the inlet and the outlet and having a closure member and an orifice closable thereby, control mechanism wherein a flexible diaphragm is movable by gas pressure acting against a yieldable force (usually the force of a spring), and a connection between the diaphragm and the regulator valve closure member, the arrangement being such that over a range of pressures the connection causes or permits opening movement of the regulator valve upon decrease in gas pressure and closing movement upon increase in gas pressure; such regulators are generally referred to in this specification as being "of the kind specified."

When pressure in the outlet of a gas pressure regulator becomes excessively high, e.g. by reason of failure of the regulator valve closure member, it is highly desirable, for safety, that the pressure regulator should shutoff gas flow to the outlet even if the regulator valve closure member has failed. The object of the present invention is to provide a gas pressure regulator which is simple in construction and reliable in operation and which provides high-pressure cutoff. Moreover the invention makes it readily feasible to construct pressure regulators which in addition provide for low-pressure cutoff.

The invention provides a gas pressure regulator of the kind specified, which also includes a cutoff valve disposed in series with an upstream of the regulator valve and having a closure member and an orifice closable thereby, the connection between the diaphragm and the regulator closure member being also connected to the cutoff closure member, the connection between the diaphragm and the regulator closure member having therein a spring loaded linkage able to "break" the connection by means of an overcenter trip action of the linkage when the gas pressure acting against the diaphragm exceeds a predetermined upper limit, the arrangement being such that upon tripping of the linkage, the cutoff closure member is moved to close the cutoff orifice. The expression "tripped" refers to the position which the parts of the linkage assume when the connection has been "broken" and the expression "normal" denotes the condition when the linkage has not tripped. The expression "broken" denotes that the position of the component parts of the connection has changed so that it yields or causes reversal of movement. The arrangement being such that in "normal position" line between the two anchor points lies on one side of the pivot common to the operating lever and the trip lever, and such that upon the gas pressure reaching the predetermined upper limit, the link turns the trip lever about its said common pivot so that the said line moves to the other side of said common pivot to trip the lever, and the relative dimensions of the parts and the characteristics of the spring being such that in the normal position the operating lever and the trip lever move as one.

Preferably the regulator closure member and the cutoff closure member are mounted coaxially and rigidly connected so that they move as one. Conveniently, also, the regulator closure member may be fast with an operating spindle forming part of the connection between that closure member and the diaphragm. The linkage may include a link pivotally connected at one end near the diaphragm and it may include an operating lever having an operative end able to act upon the free end of the operating spindle to move the regulator closure member towards and away from the regulator orifice, the operating lever being fulcrummed at a point near its operative end a short way removed from the axis of the operating spindle but remote from the free end of the operating lever so as to afford a mechanical advantage. In a preferred embodiment, a trip lever is interposed between and pivoted to the link and to the operating lever, the trip lever being acted upon by a spring anchored to the operating lever and to the trip lever, the arrangement being such that in normal position a line between the two anchor points lies on one side of the pivot common to the operating lever and the trip lever, and such that upon the base pressure reaching the predetermined upper limit, the link turns the trip lever about its said common pivot so that the said line moves to the other side of said common pivot to trip the lever, and the relative dimensions of the parts and the characteristics of the spring being such that in the normal position the operating lever and the trip lever move as one. Desirably, the trip lever and the operating lever bear one upon the other, preferably through the intermediary of the projection from the trip lever (such as a pin). Alternatively it would be feasible to have the spring extend between the trip lever and the link, the arrangement being similar (mutatis mutandis).

Desirably, the relative proportions of the parts are such that when the gas pressure falls below a predetermined lower limit, the cutoff closure member, moving as one with the regulator closure member, is moved to close the cutoff orifice.

In order that the invention may be clearly understood and readily carried into effect, two embodiments thereof will now be described, by way of example only, with reference to the accompanying drawings in which:

FIG. 1 is a longitudinal section of one form of gas pressure regulator embodying the invention; and, FIGS. 2 to 4 are longitudinal sections of a modified form of pressure regulator, showing the position of the moving parts during normal operation, their position at excessively low outlet pressure and their position when the mechanism has tripped.

In FIG. 1 of the drawings, there is shown a gas pressure regulator having a control mechanism casing 10 consisting of a casting and having a flange 12 mating with a corresponding flange 14 of a diaphragm chamber cover 16. The flanges 12 and 14 are secured together by screws 18 and grip therebetween a bead 20 formed around the circumference of a flexible diaphragm 22. The bead 20 helps to effect a gastight seal between the casing 10 and the cover 16. The cover 16 includes a chimney 24, internally threaded at 26 for the reception of a correspondingly threaded adjustment nut 28 having therein a central aperture 30. The diaphragm 22 and a circular central stiffener disc 32 fitted to it both have a central aperture to receive a plug 34 formed with a shoulder to which the diaphragm and disc are secured by nut and locknut 36. Plug 34 carries a resetting rod 38 extending upwardly through aperture 30 in the nut 28 and terminating in a knob 40. Chimney 24 is closed by a screw cap 42 surmounting knob 40. Diaphragm chamber cover 16 has an internal downwardly projecting collar 44 serving as an abutment for the diaphragm disc 32 to limit its upward movement. Cover 16 also has a screw-threaded vent 46 to receive a threaded plug (not shown) which may be piped to a safe zone or fitted with a screen but is not to be closed. A helical compression spring 47 bears against nut 28 and stiffener disc 32 and urges diaphragm 22 downwards.

The control mechanism chamber is formed with a connector part 48 secured to a valve chamber 50 by means of bolted flanges (not shown) and a sealing member 52 effects a gastight seal therebetween. The connector is formed with a spigot 54 locating in a bore 56 of the valve chamber and the connector also incorporated a sleeve 58 for the reception slidably therein of a valve operating spindle 60.

The valve chamber 50 has an internally threaded gas inlet 62 and, coaxial therewith, an internally threaded gas outlet 64. Gas pressure in outlet 64 is transmitted to the control mechanism chamber by ports 65. The inlet and the outlet are separated by a wall 66 provided with a circular threaded aperture 68 therein for the reception of a correspondingly threaded insert 70 having a bore 72 therein constituting a regulator orifice and a slightly larger counterbore 74 constituting a cutoff orifice. A threaded circular aperture 76 is provided in the valve chamber 50 opposite the bore 56 and is closed by a correspondingly threaded plug 78. The valve spindle 60 carries a regulator closure member 80 having a resilient insert 82 able to close the regulator orifice 72. Orifice 72 and closure member 80 (with its insert 82) together constitute the regulator valve. A connecting spindle 83 passes with clearance through bore 72 and counterbore 74 of insert 70 and carries a cutoff closure member 84 provided with a resilient facing 86 able to close cutoff orifice 74. Orifice 74 and closure member 84 (with its facing 86) together constitute the cutoff valve. A continuation spindle 88 mounted on cutoff closure member 84 is supported in a blind bore 90 formed in plug 78. A helical compression spring 91 bears against plug 78 and cutoff closure member 84 and urges the latter towards orifice 74. Spindles 60, 83 and 88, and closure members 80 and 84, and the bores in which they are guided are all coaxial.

Regulator closure member 80 is connected to diaphragm 22 by valve spindle 60 and a linkage which includes an operating lever 92, a trip lever 94 and a link 96. Link 96 is pivotally secured by pivot 98 to plug 34 and, at its other end, to trip lever 94 by pivot 100. Trip lever 94 is pivotally secured to operating lever 92 by pivot 102. A tension spring 104 is anchored to trip lever 94 at pivot 100 and to operating lever 92 by a pin 106. The connection is shown in FIG. 1 in its normal position; the line joining the anchorages of tension spring 104 is below pivot 102 and thus spring 104 tends to turn trip lever 94 clockwise about pivot 102 so that a pin 108 projecting from trip lever 94 abuts against an upper edge 110 of operating lever 92. The end of operating lever 92 remote from trip lever 94 bears against valve operating spindle 60 and is formed with a mouth 112 (able to abut a pin 113 provided in spindle 60) and with an abutment head 114 able to abut the wall of the connector 48 if and when resilient insert 82 has been damaged. Operating lever 92 is fulcrummed at pivot 116 a short distance below mouth 112 but at the end of operating lever 92 remote from trip lever 94. In this way, operating lever 92 affords mechanical advantage when lifted by trip lever 94. A protuberance 118 formed in the bottom of casing 10 acts as an abutment for the bottom edge 120 of that lever.

Turning now to FIG. 2, it will be seen that the modified form of pressure regulator there shown is very similar to that of FIG. 1. Operating lever 92 lacks some of the refinements of that shown in FIG. 1 and so does control mechanism casing 10. For convenience, the operation of both forms of pressure regulator will be described with reference to FIGS. 2 to 4.

FIG. 2 shows the normal operation of the regulator. Diaphragm 22 is urged downwardly by spring 47 and upwardly by gas pressure and assumes the position shown. Link 96 lifts operating lever 92 through the intermediary of trip lever 94, with pin 108 held tight against upper edge 110 by the force in tension spring 104. This is because the line joining the anchorages of spring 104 (i.e. the line connecting pivot 100 and pin 106) lies below pivot 102. In the result operating lever 92 and trip lever 94 move as one. The operative end of operating lever 92 bears against valve spindle 60 to hold resilient insert 82 of regulator closure member 80 against regulator orifice 72 (closing the regulator valve). A slight drop in pressure in outlet 64 results in slight downward movement of diaphragm 22 and slight clockwise rotation of operating lever 92 about pivot 116. Consequently spindle 60 can be moved to the right by spring 91 to lift closure member 80 slightly off orifice 72. And, conversely, a slight rise in pressure of the outlet will cause regulator closure member 80 to close orifice 72. The cutoff valve remains open throughout.

FIG. 3 shows the position of the parts when gas pressure in the outlet drops below a predetermined lower limit. Diaphragm 22 is moved down by spring 47, link 96 moves operating lever 92 down as far as it will go, valve stem 60 moves regulator closure member 80 away from orifice 72 (opening the regulator valve wide) and connecting spindle 83 permits cutoff closure member 84 to be moved to the right by spring 91 so that its resilient facing 86 closes cutoff orifice 74. Thus, gas supply to outlet 64 is cut off. The cutoff valve will remain closed until the pressure regulator is reset unless pressure again builds up in the outlet 64 resulting from gas having been admitted to the outlet pipe from elsewhere. To reset the pressure regulator, cap 42 is removed and knob 40 lifted. This results in opening of the cutoff valve and gas can pass to outlet 64 unless knob 40 is lifted too far in which case regulator closure member 80 would close regulator orifice 72. When pressure has built up in outlet 64 sufficiently to prevent closure of the cutoff valve, knob 40 may be released and cap 42 replaced for normal operation of the regulator.

FIG. 4 shows the position of the parts when the control mechanism has tripped. As pressure builds up in the outlet to the predetermined upper limit, diaphragm 22 is forced upwardly against the action of spring 47. Consequently regulator closure member 80 is forced increasingly more tightly upon orifice 72. Thereupon, operating lever 92 is no longer able to swivel about pivot 116 in an anticlockwise direction and further upward movement of diaphragm 22 results in pivoting of trip lever 94 about pivot 102 extending tension spring 104. As a result, pin 108 is lifted off upper edge 110 of operating lever 92 and the line connecting the anchorages of spring 104 crosses over onto the other side of pivot 102, whereupon spring 104 contracts again so that trip lever 94 swings around by an overcenter trip action and thus "breaks" the linkage. Consequently, operating lever 92 is urged into its lowermost position and cutoff closure member 84 closes cutoff orifice 74. As may readily be seen by comparison of FIGS. 2 and 4, the position of the component parts of the connection (and in particular of the linkage) has changed so that it yields to permit spring 91 to move valve spindle 60 to the right. Immediately after cutoff occurs due to high outlet pressure the diaphragm will be forced into its highest position and lever 92 into its lowest position. The diaphragm will remain in this position only if the system into which the regulator discharges is gastight, otherwise it will fall and if the setting of spring 47 is high enough may reach the position indicated in FIG. 3. This means that the lever system may be automatically reset or restored to "normal." But in any event, the regulator will not reopen until knob 40 has been lifted to reopen the cutoff valve as previously explained in relation to FIG. 3. If the setting of spring 47 is not high enough for automatic resetting the pressure regulator is reset by pressing on knob 40 to remake the linkage and thereupon lifting the knob to reopen the cutoff valve.

The force exerted by spring 47 may be altered by adjustment of the axial position of nut 28 in chimney 24 by rotation. This results in consequent adjustment of the normal outlet pressure.

Two features may be mentioned in relation to the operation of FIG. 1. Firstly, the operating lever 92, in its lowermost position, abuts against protuberance 118 which limits its movement. Secondly, the combination of mouth 112 and abutment head 114 on operating lever 92 permits permanent indentation made in resilient insert 82 by regulator orifice 72 to be taken up by an amount determined by the gap between head 114 and the wall of connector 48; when after many years of service, indentation is such that head 114 abuts connector 48, further indentation is prevented which might interfere with the proper functioning of the trip mechanism.

And, in connection with FIGS. 2 to 4, mention may be made of the interengagement between the operative head of operating lever 92 and valve spindle 60 whereby a pin 122 on spindle 60 engages in a slot 124 in operating lever 92. When the linkage has tripped as a result of rise in pressure not only does the connection yield to permit spring 91 to move spindle 60 to the right but the interengagement mentioned above actually results in reversal of movement imparted to valve closure member 80 by operating lever 92.

The gas pressure regulators above described have many advantages. First and foremost they include a safety cutoff operating both at predetermined higher and lower levels of pressure in the outlet. The mechanism may be made simple and robust and reliable. It is vitally important that the safety cutoff should operate properly where required and this may happen for the first time when the regulator has been in normal use for many years when the seating has been damaged. Such lapse of time is apt to result in mating parts becoming rusted together or strongly adhering together for other reasons (as by becoming "gummed up" by grease and dirt). It is thought that the constructions hereinbefore described will show little or no tendency to fail on this score, since the scope for rusting together or gumming up is very slight indeed. Only pivot 102 is not used during normal regulating operations and the turning moment about it, when the mechanism is required to trip will be enormous, and, it is thought, more than sufficient to overcome any tendency there may be to stick. The design gives a very close consistency with repeated operations with great ease of reopening without using special tools.

It will readily be appreciated that modifications may be made in the pressure regulators above described without departing from the scope of the invention. Thus, for example, a spring loaded toggle mechanism could be incorporated in link 96 in place of the mechanism making use of trip lever 94.

I claim:

1. A gas pressure regulator comprising a gas inlet, a gas outlet, a regulator valve, said regulator valve having a regulator valve closure member and an orifice closable thereby, a cutoff valve, said cutoff valve being disposed in series with an upstream of said regulator valve and having a cutoff valve closure member and an orifice closable thereby, control mechanism, said control mechanism having a flexible diaphragm movable by gas pressure acting against a yieldable force, a connection between said diaphragm and an operating lever for controlling said regulator valve closure member and said cutoff valve closure member, an operating spindle forming part of said connection and having mounted coaxially thereon said regulator valve closure member and said cutoff valve closure member, said connection also including a linkage able to "break" said connection by overcenter trip action, said linkage including a link and an operating lever, said link being pivotally connected at one end near said diaphragm and said operating lever having an operative end able to act upon a free end of said operating spindle to move said regulator valve closure member towards and away from said regulator valve orifice, and said operating lever being fulcrummed at a point near said operative end a short way removed from the axis of said operating spindle but remote from a free end of said operating lever, said connection also including a trip lever and a spring, said trip lever being connected to said flexible diaphragm and being pivoted to said operating lever, said spring extending from an anchor point on said operating lever to an anchor point on said trip lever, the arrangement being such that in normal operating conditions a straight line between the two anchor points lies on one side of the pivot common to the operating lever and the trip lever, and the two levers move as one so that over a range of pressures said connection causes opening movement of the regulator valve upon decrease in gas pressure and closing movement upon increase in gas pressure, and such that when said gas pressure exceeds a predetermined upper limit the trip lever pivots relative to the operating lever so that the line between the two anchor points moves to the other side of said common pivot to trip the lever so that said linkage "breaks" to cause closing movement of the cutoff valve.

2. A regulator according to claim 1 wherein of the trip lever and the operating lever one is provided with a projection whereby one of said levers is able to bear upon the other.

3. A regulator according to claim 1 wherein the relative proportions of the parts are such that when the gas pressure falls below a predetermined lower limit, the cutoff closure member, moving as one with the regulator closure member, is moved to close the cutoff orifice.